United States Patent
Merk et al.

(10) Patent No.: US 12,437,855 B2
(45) Date of Patent: Oct. 7, 2025

(54) SYSTEM AND METHOD FOR DATA-DRIVEN INDIVIDUALIZED NUTRITION

(71) Applicant: LOEWI GMBH, Munich (DE)

(72) Inventors: Philipp Merk, Garching (DE); Calvin Devereux, Gräfelfing (DE); Adrian Kapsalis, Munich (DE)

(73) Assignee: etone Motion Analysis GmbH, Berlin (DE)

( * ) Notice: Subject to any disclaimer, the term of this patent is extended or adjusted under 35 U.S.C. 154(b) by 191 days.

(21) Appl. No.: 17/794,680

(22) PCT Filed: Jan. 21, 2021

(86) PCT No.: PCT/EP2021/051354
§ 371 (c)(1),
(2) Date: Jul. 22, 2022

(87) PCT Pub. No.: WO2021/148545
PCT Pub. Date: Jul. 29, 2021

(65) Prior Publication Data
US 2023/0072252 A1    Mar. 9, 2023

(30) Foreign Application Priority Data
Jan. 22, 2020 (EP) .................... 20153234

(51) Int. Cl.
*G16H 20/60* (2018.01)
*G16B 20/00* (2019.01)
(Continued)

(52) U.S. Cl.
CPC ............. *G16H 20/60* (2018.01); *G16B 20/00* (2019.02); *G16H 40/67* (2018.01); *G16H 50/20* (2018.01)

(58) Field of Classification Search
CPC ........ G16H 20/60; G16H 40/67; G16H 50/20; G16B 20/00
See application file for complete search history.

(56) References Cited

U.S. PATENT DOCUMENTS

| 8,762,167 B2 | 6/2014 | Blander et al. |
| 9,381,160 B2 * | 7/2016 | Niichel ................ A61K 9/5047 |

(Continued)

FOREIGN PATENT DOCUMENTS

| EP | 3469359 A1 | 4/2019 | |
| WO | WO-2021046477 A1 * | 3/2021 | ............. G16H 40/63 |

OTHER PUBLICATIONS

WIPO, International Search Report of the International Searching Authority for International Application No. PCT/EP2021/051354 (Apr. 30, 2021) pp. 1-3.

(Continued)

*Primary Examiner* — Michael I Ezewoko
(74) *Attorney, Agent, or Firm* — Siritzky Law, PLLC (57) ABSTRACT

The present invention relates to a system and a method comprising an automated composition of an individualized nutritional composition. The present invention provides a datastore configured to store and receive sensor dataset(s) from at least one or a plurality of sensors. The invention further provides a processing component, wherein the processing component is configured to extract the sensor dataset(s) from the datastore. Further, the processing component is configured to automatically generate structured biomarker data based on the extracted sensor dataset(s). The invention also provides a recommending engine, wherein the recommending engine is configured to determine a dose value based on the structured biomarker data. In a further embodiment the invention provides a mixer. The mixer is (Continued)

configured to automatically generate an optimized nutritional composition based on the dose value.

18 Claims, 5 Drawing Sheets

(51) Int. Cl.
*G16H 40/67* (2018.01)
*G16H 50/20* (2018.01)

(56) References Cited

U.S. PATENT DOCUMENTS

| | | | | |
|---|---|---|---|---|
| 10,846,622 | B2* | 11/2020 | Neumann | G06N 5/02 |
| 10,998,101 | B1* | 5/2021 | Tran | G16H 50/30 |
| 11,133,111 | B2* | 9/2021 | Neumann | G16B 40/20 |
| 11,154,240 | B2* | 10/2021 | Neumann | A61B 5/4842 |
| 11,161,011 | B2* | 11/2021 | Neumann | A63B 24/0062 |
| 11,315,688 | B2* | 4/2022 | Neumann | G06N 20/10 |
| 11,328,819 | B2* | 5/2022 | Neumann | G06F 16/906 |
| 11,392,856 | B2* | 7/2022 | Neumann | G16B 20/00 |
| 11,393,590 | B2* | 7/2022 | Neumann | G16B 50/30 |
| 11,414,704 | B2* | 8/2022 | Dogan | C12Q 1/6883 |
| 11,461,664 | B2* | 10/2022 | Neumann | G06N 3/126 |
| 11,478,766 | B2* | 10/2022 | Ciepiel | B01F 35/2209 |
| 11,672,446 | B2* | 6/2023 | Hadad | G06F 16/90324 600/365 |
| 11,816,539 | B1* | 11/2023 | Granson | G06N 5/01 |
| 2014/0314856 | A1* | 10/2014 | Niichel | A61K 33/00 424/490 |
| 2018/0253840 | A1* | 9/2018 | Tran | G16H 40/63 |
| 2019/0290172 | A1* | 9/2019 | Hadad | A61B 5/14532 |
| 2020/0315527 | A1* | 10/2020 | Neumann | A61B 5/4842 |
| 2020/0321119 | A1* | 10/2020 | Neumann | G06F 16/906 |
| 2020/0321120 | A1* | 10/2020 | Neumann | G16H 50/20 |
| 2020/0321122 | A1* | 10/2020 | Neumann | G16B 40/20 |
| 2020/0338394 | A1* | 10/2020 | Neumann | A63B 24/0062 |
| 2020/0342352 | A1* | 10/2020 | Neumann | G06N 20/00 |
| 2020/0356864 | A1* | 11/2020 | Neumann | G06N 3/088 |
| 2020/0394565 | A1* | 12/2020 | Neumann | G06N 20/00 |
| 2021/0393196 | A1* | 12/2021 | Neumann | A61B 5/7267 |
| 2022/0023719 | A1* | 1/2022 | Neumann | A63B 24/0075 |

OTHER PUBLICATIONS

WIPO, Written Opinion of the International Searching Authority for International Application No. PCT/EP2021/051354 (Apr. 30, 2021) pp. 1-6.

* cited by examiner

SYSTEM AND METHOD FOR DATA-DRIVEN INDIVIDUALIZED NUTRITION

RELATED APPLICATIONS

This application is the National Stage (a 371) of International Application No. PCT/EP2021/051354, filed Jan. 21, 2021, the entire contents of which are hereby fully incorporated herein by reference for all purposes. PCT/EP2021/051354 claims the priority benefit of European patent application 20153234.8, filed Jan. 22, 2020, the entire contents of which are hereby fully incorporated herein by reference for all purposes.

FIELD

The present invention relates to a system and a method to automatically compose an individualized nutritional composition.

BACKGROUND

Health systems have achieved remarkable progress in treating life-threatening diseases such as heart attacks, strokes and various cancers, yet wide disparities in survival rates persist not only between countries but also among hospitals and health care providers within each country. It is not enough to only collect data on mortality. Health care needs to place people at the centre, which requires asking patients more systematically whether they are better, or worse, following different health care interventions. One must also measure how well the primary care sector is managing the growing number of people living with one or more chronic or cardiovascular conditions. The OECD and the European Commission are working together with countries to fill these critical data gaps on patient-reported experience and outcome measures.

Large disparities in life expectancy persist not only by gender or age, but also by socioeconomic status. On average across the EU, 30-year-old men with a low level of education can expect to live about 8 years less than those with a university degree (or the equivalent), while the "education gap" among women is narrower, at about 4 years.

These gaps largely reflect differences in exposure to risk factors, but also indicate disparities in access to care. At least one in six adults are obese across EU countries with wide disparities by socioeconomic status.

New digital technologies offer great opportunities to promote healthy ageing and achieve more efficient and people-centred care. The use of Electronic Medical Records and ePrescribing is growing across EU countries, and growing numbers of EU residents use the internet to obtain health information and access health services, although there are disparities by age and socioeconomic groups.

For example, EP3469359A1 discloses a method for providing nutritional supplement information for a subject (1) is proposed, said method including a sequence of the following steps in given order: A) taking a sample (3) from the subject (1); B) analysing said sample to determine the nutritional status of the subject (1); C) based on the results calculation of the required nutritional supplements to improve the nutritional status of the subject (1); D) providing individualized nutritional supplement information to the subject (1). This sequence of A)-D) is repeated at least once after a time span of at least 2 days or one week for adapting the provided nutritional information in step D) of the following sequence based on the development of the subject (1). Step C) involves the prediction of at least one initial characteristics matrix and the multiplication of this matrix weighted with weighting factors, with an initial recommendation vector for the calculation of a target profile vector after a given first time interval from the profile vector as determined in step B), and in each following cycle adaptation in that the difference between the previously calculated target profile vector and the profile vector as determined in the actual analysis step B) is minimized by adapting at least one of the characteristics matrix and the weighting factors and using the adapted for the calculation of the required next recommendation vector.

U.S. Pat. No. 8,762,167B2 provides method and systems for generation of personalized health plans. Personalized, health and performance programs are generated for individuals based on various biomarkers and performance and lifestyle assessments. In one embodiment, a diagnostic test of blood or other biological specimen(s) is used to determine key biological marker levels. Information and assessments of the user's physical performance, lifestyle and health and wellness goals are also collected and provided to an expert system that matches the biomarker levels and assessments to a knowledgebase of scientific knowledge about biomarker levels and health and fitness outcomes. Personal recommendations and advice on nutrition and exercise is then generated, which may be used to help individuals reach their diet, fitness, and wellness goals and improve their physical and mental performance and well-being in measurable ways.

SUMMARY

In light of the above, it is an object of the present invention to overcome or at least alleviate the shortcomings of the prior art. More particularly, it is an object of the present invention to automatically generate a customized nutritional composition. It is a further object of the present invention to generate fully automated, concise and scalable personalized biomarker data. These objects are fulfilled by the method and system of the present invention.

In a first embodiment a system configured to compose an individualized nutritional composition is disclosed. The system comprises a datastore. The datastore is configured to store and receive sensor dataset(s) from a plurality of sensors. The system further comprises a processing component, which is configured to extract the sensor dataset(s) from the datastore and automatically generate structured biomarker data based on the sensor dataset(s). The system further comprises a recommending engine.

The recommending engine is configured to automatically determine a dose value based on the biomarker data. Furthermore, the system comprises a mixer. The mixer is configured to automatically generate an optimized nutritional composition based on the dose value. The datastore may be comprising a storage architecture. It may be comprising one or multiple physical storage devices. Datastore may further comprise one or a plurality of databases. In some embodiments sensor(s) may be configured to automatically transmit the sensor dataset(s) to the datastore. The processing component may comprise a CPU (microprocessor), GPU, motherboard, chipset, clock, multi core processing devices and the alike. The recommending engine may be configured to carry out sequences of arithmetic or logical operations automatically via programming. The recommending engine may be connected with the processing unit via a computer network or a computer cluster.

The mixer may be an automated machine which may be configured to receive operational instructions from the recommending engine. In some embodiments the mixer may comprise a device configured with a motor for fast or slow blending or stirring. The mixer may be configured to be programmable with a pre-determined number of nutrition compositions. Further, the mixer may be configured to be programmable with a time. For example, if a nutritional composition of vitamin D and Fe is recommended in a 1:2 ration in a 10-gm composition at 10 am the mixer may be configured to generate the recommended composition. The system may further comprise a remote and/or a local server. In some embodiments the server may comprise the recommending engine and/or the processing component.

In a further embodiment the mixer may comprise receiving an automatically generated computer-aided design model of the nutritional composition by the recommending engine. In such embodiments the mixer may be configured to develop a three-dimensional object based on the model. Furthermore, the nutritional composition may comprise at least one or a plurality of nutrient supplements, dietary supplements, etc. The mixer may further comprise fusing the powder grains and/or the liquid molecules together, preferably by using additive manufacturing (AM) to compose the nutritional composition.

In a preferred embodiment the recommending engine may be configured to generate the dose value comprising an associated dosing time. For example, 17 mg Fe per day. In such embodiments the mixer may comprise developing the nutritional composition according to the time, for example, every day. In a further embodiment the mixer may be configured to develop the nutritional composition in bulk, for example, for 90 days. The nutritional composition may comprise a dose component and/or flavouring etc. For example, a nutritional composition for 17 mg Fe may comprise 800 mg of Fe granulate.

In some embodiments each sensor may be associated with at least one user terminal. The user terminal may be any electronic or electromechanical hardware device such as a personal computer, a mobile application, wearables, fashion electronics. In some embodiments the sensor(s) may be incorporated into clothing or worn on the body as implants or accessories.

The structured biomarker data generated by the processing component may comprise a plurality of analytes and phenotypes and genotypes and lifestyle data and condition data and surrounding data. For example, if the sensor dataset comprises data from a blood report from a lab test, the processing component may be configured to generate the structured biomarker data comprising levels of HDL cholesterol (analyte). The structured biomarker data may comprise longitudinal data. Further, the sensor dataset may be configured to extract from a sensor (questionnaire) a family history of cardiovascular disease (phenotype) for example via an online survey. The sensor may further be configured to modify the data to a machine-readable format before transmitting it to the datastore.

In some embodiments the processing component may be configured with an artificial neural network. In such embodiments the processing component may be classifying the sensor dataset into the structured biomarker data. The sensor dataset may comprise a plurality of sensor data structure generated by the plurality of sensors. For example, an audio data may be comprising a sound wave data structure generated by a voice intonation sensor. In such embodiment, the processing component may be configured to generate the structured biomarker data comprising mood, tiredness etc. In a further embodiment the processing component may be trained to predict the structured biomarker data. In such embodiments the processing component may be trained in a supervised or unsupervised way by using existing knowledgebases such as WHO data repository, NICE guidelines, etc. For example, using the sensor comprising the Electroencephalograms (EEG) fatigue levels through a time interval may be measured. If the fatigue levels are more than a threshold value (the threshold value may be learned by the processing component from the existing knowledgebase) the processing component may be configured to predict thalassemia, preferably in combination with a measure value associated with haemoglobin.

In a further embodiment the processing component may be configured to access the measure value of each component of the biomarker data, such as analytes. The measure value may be directly calculated using the sensor dataset. In some further embodiments the measure value may be predicted based on at least one condition data, disease data, symptom data, phenotype data, medication data, lifestyle data inputted at the user terminal as sensor dataset.

The processing component may further be configured to detect a type of the sensor. In such embodiments the processing component may be configured to classify the sensor dataset based on the type of the sensor. The processing component may further comprise automatically detecting the type of the sensor(s) based on a data structure of the sensor dataset. Furthermore, the processing component may be configured to program the artificial neural network based on the type of the sensor(s). This may be advantageous when the sensor dataset comprises a plurality of data structure. For example, audio data inputted via the voice intonation sensor and/or the image data comprising lab report inputted by an optical sensor.

In some further embodiments the type of sensor(s) may comprise at least one biochemical sensor and/or a wearable biochemical sensor. The biochemical sensor may comprise a receptor and a transducer, the receptor may be configured to receive chemical information, e.g., the concentration of a given compound, such as, pH, etc and convert into a form of energy, such as electrical energy. The biochemical sensor may further comprise a transducer configured to measure the converted form of energy. In some embodiments the biochemical sensors may comprise RE oxide film. In such embodiments the sensors offer several advantages regarding size, performance, fabrication, analysis, and production cost due to their compatibility with semiconductor technology.

In some further embodiments the type of sensors may comprise at least one of the voice intonation sensor and/or mood recognition sensor and a face mood recognition sensor and an activity sensor and a skin humidity sensor comprising of a galvanic skin response sensor and a thermometer and a blood oxygen sensor and a questionnaire. The sensor(s) may comprise at least one of an Accelerometer and GPS and optical heart rate monitors and UV sensor and bioimpedance sensor and actigraphy sensor and pH sensors and oximeter.

In a further embodiment the sensor(s) may comprise an optical sensor, such as a camera. The optical sensor may be configured to extract at least one image and/or video data, preferably at the user terminal. For example, the image of the lab report, images of sign and/or symptom data. For example, pale skin may represent lack of vitamin B or ridges on nails may be due to lack of calcium.

In a further embodiment a chemical and/or a biological sample may be stored in a physical datastore and/or a biobank. In such an embodiment the processing component may be configured to generate the structured biomarker data using the sample stored in the physical datastore. The physical datastore may comprise a laboratory storage unit and/or a biobank. The sample may comprise at least one of blood, plasma, serum, urine, droplets from the eye, saliva, spinal-cord fluid, interstitial fluid, sweat, etc. In a further embodiment sensor dataset may be generated via a gas chromatographer coupled with a mass spectroscope. This is particularly advantageous when the sample comprises breath data and/or frozen blood samples which may be stored in the physical datastore. In a further embodiment the processing component may be configured with at least one of GC/MS and HPLC and ICP-MS and ECLIA and ELISA and Immunoturbidimetry and VIS-Photometry and UV-Photometry and LC/MS-MS, further configured to generate the structured biomarker data.

In some embodiments the structured biomarker data and/or the measure value may be transmitted to the recommending engine. The recommending engine may be configured with a recommender system. The recommender system may comprise machine learning techniques. Particularly, the content-based recommender system and/or collaborative filtering recommender system. The content-based recommender system may be configured to generate the dose value based on the biomarker data and a target biomarker data. The target biomarker data may be generated by the processing component using the existing knowledgebase. Further, the collaborative filtering recommender system may be configured to generate the dose value based on a dose interaction. In some embodiments the dose interaction may be automatically calculated by the recommending engine. In such embodiments the recommending engine may comprise a disease interaction analyser. The disease interaction analyser may be configured to extract disease data from the sensor dataset. The disease data may further comprise a pathological process in response to an internal or external factor. For example, cardiovascular disease which can be caused by abnormalities in the body such as atherosclerosis. The disease interaction analyser may further configure to determine dose interaction with a plurality of diseases. For example, if the disease data comprises 'past cancer therapy' and 'osteoarthritis' the disease interaction analyser may delete folic acid from the dose value and may recommend glucosamine sulphate.

In some embodiments, the dose value may comprise the dose components, wherein the dose components may be at least one or a plurality of analytes and/or dietary supplements, nutritional supplements, etc. The dose value may further comprise a weight associated with each dose component. The dose interaction value may comprise a likelihood of the at least dose component interacting with each other and/or interacting with the structured biomarker data. The dose interaction value may further comprise a numerical value associated with a severity of interaction of the at least dose component with each other and/or any dose component with the structured biomarker data. In such embodiments the structured biomarker data may also comprise any allergies, weather, geographical data, etc.

The recommending engine may further be configured with a medication interaction analyser. The medication interaction analyser may be configured to extract the condition data from the sensor dataset. The condition data may comprise information about something external which may affect the biomarker data. Such as medicine intake. For example, if the condition data comprises levothyroxine and/or warfarin the medication interaction analyser will automatically delete calcium, iron, chromium and vitamin k2 from the dose value. The recommending engine may further comprise a lifestyle interaction analyser. The lifestyle interaction analyser may further be configured to pull lifestyle data, geographical data, age, time, gender data, past data from the sensor dataset and/or the structure biomarker data. For example, if the data comprises allergic to leather then the dose value may not comprise chromium. The geographical data may be advantageous to generate the dose value, for example, vitamin D levels show a strong correlation with the seasons in some locations.

In a further embodiment the recommending engine is configured with a monitoring component. The monitoring component may be configured with a self-improving artificial intelligence unit. This is particularly advantageous for the recommending engine to learn individual efficiency to metabolize certain dose component. For example, if two users with the same measure value of vitamin D in the biomarker data with same demographic data take the same amount of vitamin D for 30 days, they might not have the same levels of vitamin D in an updated biomarker data. In such embodiments the monitoring component may be programmed to change the dose value and/or associated measure value based on the individual metabolism. With each inputted value of updated biomarker data, the monitoring component may be configured to improve the generation of the dose value. The monitoring component may further be configured to learn the dose interaction value using the structured biomarker data and the updated biomarker data. The updated biomarker data may be generated by extracting updated sensor dataset at a pre-determined time interval. The pre-determined time interval may be automatically identified by the processing component and/or manually added. For example, the sensor dataset(s) may be pulled from the sensor(s) every day at 10:00 or every Saturday 17:00.

In some embodiments the monitoring component may be configured with a scheduling unit. The scheduling unit may be configured to pull the structured biomarker data within a pre-determined time period. In some further embodiments the monitoring component may further be configured to generate a peer score. The peer score may comprise a numerical value associated with the structured biomarker data of one user compared to the structured biomarker data of at least one or a plurality of second users. In a further embodiment, the comparison may be quantized numerically. The peer score may be associated with a pre-determined measure value associated with specific biomarker components.

Furthermore, in some embodiments the mixer may be configured to be installed at the user terminal. The mixer may be configured to pull the dose value from the recommending engine. In a further embodiment the mixer may be configured to enable a bi lateral data exchange with the monitoring component. This may be particularly advantageous for the monitoring component to learn when the nutritional composition was generated and/or extracted from the mixer in order to generate a metabolism data. The user terminal may also be configured to extract a schedule information from the user. The schedule information may comprise a timestamp of when the nutritional composition has been activated.

The nutritional composition may be at least one of or a plurality of capsule and tablets and granular(s) and powder and bar and syrup and elixirs and suspensions and emulsions and any combination thereof. The nutritional composition may comprise the dose component(s). In a further embodiment the mixer may comprise a storage of active substance, preferably the dose components and excipients, may be in powder and/or granule form, which may be pressed or compacted into a solid dose. The excipients can include diluents, binders, etc. The storage may further be equipped gas flush function, wherein the gas may be an inert gas such as nitrogen, etc. This may be particularly advantageous to keep the components of the storage fresh.

In a further embodiment the nutritional composition may comprise a modified-release supplement. The modified-release supplement may be further configured to decrease the rate of the dose component metabolism. In such an embodiment the sustained-release supplement may be configured to release the at least one dose component over a time span of 1 hour to 24 hours, such as 3 hours to 16 hours, preferably 5 hours to 10 hours, more preferably 6 hours to 8 hours. Furthermore, the sustained-release supplement may comprise liposomes, hydrogels, drug-polymer conjugates, etc. This is particularly advantageous in order for a dose component to be released slower and steadier while having the advantage of being taken at less frequent intervals than immediate-release (IR) formulations.

Performing the multidimensional optimization can include at least two variables to be optimized. These can for example be a set of two from the following: cost to manufacture, margin, expected customer lifetime value, fulfilling estimated nutrient requirement, cost to the entity, bioavailability of the included nutrients.

On the basis of the multidimensional optimization the processing module can generate an optimized combination of nutrients. The processing module can match existing nutrient products from the product nutrient(s) database to the optimized combination of nutrients to generate a nutrient composition.

According to a further advantageous embodiment of the invention the processing module can generate a nutrient composition(s) to be formalized in nutrient product(s) on the basis of the optimized combination of nutrients. Thus, the optimized combination of nutrients can serve as a basis to create a new nutrient product to be included in the product nutrient(s) database. In other words, on the basis of the gathered entity data an optimized combination of nutrients can be generated which can serve as a blueprint to develop new nutrient products.

Moreover, the maximum amount(s) of one or a plurality of nutrients can be pre-set in order to fulfil different requirements due to laws, personal choice, personal sensitivities or allergies etc.

In a second embodiment a method comprising the automated generation of a customized nutritional composition is disclosed. The method may be performed by the system as previously disclosed. The method can also comprise all features of the system described above and below in terms of method steps.

The invention is further described with the following numbered embodiments.

Below, system embodiments will be discussed. These embodiments are abbreviated by the letter "S" followed by a number. Whenever reference is herein made to "system embodiments", these embodiments are meant.

S1. A system configured to automatically compose an individualized nutritional composition, wherein the system comprises:
  a. a datastore (1000), configured to store and receive sensor dataset(s) (from a plurality of sensors (1-5));
  b. a processing component (5000), configured to extract the sensor dataset(s) from the datastore, and further automatically generate structured biomarker data based on the sensor dataset(s); and
  c. a recommending engine (4000), configured to automatically determine a dose value based on the structured biomarker data;

S2. The system according to the preceding embodiment wherein the system is configured with a mixer (3000).

S3. The system according to the preceding embodiment wherein the mixer is configured to automatically generate an optimized nutritional composition based on the dose value.

S4. The system according to the preceding embodiment wherein each sensor is associated with at least one user terminal (2000).

S5. The system according to any of the preceding embodiments wherein the system comprises a server.

S6. The system according to any of the preceding embodiments wherein the server is configured with the at least one of processing component and recommending engine.

S7. The system according to any of the preceding embodiments wherein the structured biomarker data comprises information related to at least one or a plurality of at least one of analytes and phenotypes and genotypes.

Embodiments Related to Classifying the Sensor Data into the Biomarker Components S8. The system according to any of the preceding embodiments wherein the processing component is configured with a machine-learning classifier configured to automatically classify the sensor dataset(s) to the at least one or a plurality of analytes and phenotypes and genotypes.

S9. The system according to the preceding embodiment wherein the processing component is configured with an artificial neural network, preferably a convolutional neural network.

S10. The system according to the preceding two embodiments wherein the processing component is configured to learn to classify the sensor dataset into the structured biomarker data using an existing labelled knowledgebase.

S11. The system according to any of the preceding embodiments wherein the processing component is further configured to automatically determining a measure value associated with the structured biomarker data.

S12. The system according to any of the preceding embodiments wherein the processing component transmits the structured biomarker data to the recommending engine.

S13. The system according to any of the preceding embodiments wherein the processing component automatically detects a type of the sensor prior to the classification of the sensor dataset.

S14. The system according to the preceding embodiment wherein the type of the sensor is detected by the processing component based on a data structure of the sensor dataset generated by the respective sensor.

S15. The system according to any of the preceding embodiments and features of S5 wherein the processing component is configured to program the artificial neural network based on the data structure of the sensor dataset.

Embodiments Related to Types of Sensors

S16. The system according to any of the preceding embodiments wherein the type of sensor(s) comprises at least one biochemical sensor.

S17. The system according to any of the preceding embodiments wherein the type of sensor comprises at least one wearable biochemical sensor.
S18. The system according to any of the preceding embodiments wherein the type of sensor comprises at least one of:
a voice intonation sensor and/or mood recognition sensor and
a face mood recognition sensor and
an activity sensor and
a skin humidity sensor comprising a galvanic skin response sensor and
a thermometer and
a blood oxygen sensor and
a questionnaire.
S19. The system according to any of the preceding embodiments wherein the sensor is configured with at least one of:
Accelerometer and
GPS and
optical heart rate monitors and
UV sensor and
bioimpedance sensor and
actigraphy sensor and
pH sensors and
oximeter.
S20. The system according to any of the preceding embodiments wherein the sensor is configured with at least one optical sensor configured to extract at least one image data or video data.
S21. The system according to any of the preceding embodiments wherein the sensor is configured with at least one audio sensor configured to record at least one voice input.
S22. The system according to any of the preceding embodiments wherein the processing component is configured to identify the measure value of structured biomarker data in a chemical and/or biological sample stored in the datastore, preferably using the at least one of the sensors.
S23. The system according to the preceding embodiment wherein the chemical and/or biological sample comprises at least one of blood, plasma, serum, urine, droplets from the eye, saliva, spinal-cord fluid, interstitial fluid, sweat.
S24. The system according to any of the preceding embodiments wherein the processing component comprises a gas chromatographer coupled with a mass spectroscope configured to determine the sensor dataset from breath data stored in the datastore.
S25. The system according to any of the preceding embodiments wherein the processing component is configured with at least one of
GC/MS
HPLC
ICP-MS
ECLIA
ELISA
Immunoturbidimetry
VIS-photometry
UV-photometry
LC/MS-MS
S26. The system according to any of the preceding embodiments wherein the system is further configured to transmit the structured biomarker data, comprising the measure value, to the recommending engine.
S27. The system according to any of the preceding embodiments wherein the recommending engine is configured to automatically generate a significance score associated with each biomarker component in the structured biomarker data.

Embodiments Related to the Recommending Engine

S28. The system according to any of the preceding embodiments wherein the recommending engine is configured with a recommender system equipped with machine learning techniques.
S29. The system according to the preceding embodiment wherein the recommending engine is configured with a content-based recommender system.
S30. The system according to any of the preceding two embodiments wherein the machine learning recommender system is configured with a collaborative filtering recommender system.
S31. The system according to any of the preceding embodiments wherein the recommending engine is configured with a disease interaction analyzer.
S32. The system according to the preceding embodiment wherein the disease interaction analyzer is further configured to extract sensor dataset from the datastore.
S33. The system according to any of the preceding embodiments wherein the sensor dataset comprises at least condition data.
S34. The system according to any of the preceding three embodiments wherein the disease interaction analyzer is further configured to automatically determine the dose value based on the interaction level of the dose value with the health condition data.
S35. The system according to any of the preceding embodiments wherein the recommending engine is further configured with a medication interaction analyzer.
S36. The system according to the preceding embodiment wherein the medication interaction analyzer is configured to determine a likelihood of an occurrence of the dose interacting with the present medication intake.
S37. The system according to any of the preceding two embodiments wherein the medication interaction analyzer is further configured to determine a level of severity of interaction of the dose value with the present medication intake.
S38. The system according to any of the preceding embodiments wherein the recommending engine is further configured with a lifestyle interaction analyzer.
S39. The system according to the preceding embodiment wherein the lifestyle interaction analyzer is configured to extract lifestyle data from the datastore.
S40. The system according to the preceding embodiment wherein the recommending engine is configured to determine the dose value based on the interaction of the dose value with the lifestyle data.
S41. The system according to any of the preceding embodiments wherein the recommending engine is further configured to extract at least one of geographical data, age, time, gender data, past data from the sensor dataset.
S42. The system according to any of the preceding embodiments wherein the recommending engine is further configured to determine the dose value based on at least one of the geographical data, age, time, gender data.

S43. The system according to any of the preceding embodiments wherein the significance score is generated based on the measure value.
S44. The system according to any of the preceding embodiments wherein the significance score is automatically generated on the basis of an existing knowledgebase.
S45. The system according to any of the preceding embodiments wherein the significance score is generated based on the geographical data, age, time, gender data, past data from the sensor dataset.
S46. The system according to any of the preceding embodiments wherein the dose value comprises at least one or a plurality of dose components, comprising at least one or a plurality of analytes and dietary supplements and nutritional supplements.
S47. The system according to any of the preceding embodiments wherein the recommending engine is further configured to calculate a weight associated with each dose component.
S48. The system according to the preceding embodiment wherein the weight is calculated based on a distance between the at least one of at least two dose components(s) and at least two analytes and at least two phenotypes on an interaction matrix.
S49. The system according to the preceding embodiment wherein the interaction matrix is automatically generated by the recommending engine based on the sensor dataset.
S50. The system according to any of the preceding two embodiments wherein the interaction matrix is generated by the recommending engine based on the existing knowledgebase.
S51. The system according to any of the preceding two embodiments wherein the interaction matrix is generated by the recommending engine based on the at least one of the geographical data, age, time, gender data from the sensor dataset and past data.
S52. The system according to any of the preceding embodiments wherein the recommending engine is configured to generate the dose value comprising an associated dosing time.

Embodiments Related to the Monitoring Component

S53. The system according to any of the preceding embodiments wherein the system further comprises a monitoring component.
S54. The system according to the preceding embodiment wherein the monitoring component is configured to extract at least one updated sensor dataset at a pre-determined time interval.
S55. The system according to the preceding two embodiments wherein the monitoring component comprises a self-improving artificial intelligence unit.
S56. The system according to the preceding three embodiments wherein the monitoring component is configured to determine a dose interaction value with the sensor dataset by comparing the biomarker data with an updated biomarker data.
S57. The system according to the preceding embodiment wherein the updated biomarker data is configured to be generated by the processing component based on the updated sensor dataset.
S58. The system according to the preceding embodiment wherein the processing component is further configured to transmit the updated sensor dataset to the monitoring component.
S59. The system according to any of the preceding embodiments wherein the processing component comprises a scheduling unit.
S60. The system according to the preceding embodiment wherein the scheduling unit is configured to pull sensor dataset associated with the user terminal within a pre-determined time period.
S61. The system according to the preceding embodiment wherein the time period is automatically calculated based on the biomarker data.
S62. The system according to any of the preceding embodiments wherein the monitoring component is further configured to automatically generate a peer score.
S63. The system according to the preceding embodiments wherein the peer score is generated based on the plurality of sensor datasets associated with the at least two user terminals.
S64. The system according to the preceding two embodiments wherein the user terminal is configured to extract the peer score from the monitoring component via a user interface.

Embodiments Related to the Mixer and User Interface

S65. The system according to any of the preceding embodiments wherein the user terminal is configured with the mixer.
S66. The system according to the preceding embodiment wherein the mixer is configured to automatically pull the dose value from the recommending engine.
S67. The system according to the preceding embodiment wherein the mixer is configured to generate the optimized nutritional composition based on the dose value by at least one of emulsifying and juicing and mixing and blending and milling and whipping and weighing and grinding and stirring the at least one or a plurality of dose components.
S68. The system according to any of the preceding embodiments wherein the recommending engine is configured to automatically generate a computer-aided design model of the nutritional composition.
S69. The system according to the preceding embodiment wherein the mixer is further configured to develop a three-dimensional object based on the computer-aided design model, preferably via additive manufacturing.
S70. The system according to any of the preceding embodiment wherein the user terminal is further configured with the user interface.
S71. The system according to the preceding embodiment wherein the user interface is configured to provide at least one recommended database to a user.
S72. The system according to the preceding embodiment wherein the recommended database comprises information related to the at least one biomarker component based on the dose value generated.
S73. The system according to any of the preceding embodiments wherein the user interface is further configured to access the sensor dataset associated with the respective user.

S74. The system according to the preceding embodiment wherein the user interface is further configured to edit at least one sensor dataset.

S75. The system according to any of the preceding embodiments wherein the user interface is configured to log at least one dietary data of the user.

S76. The system according to any of the preceding embodiments wherein the user interface is further configured to extract a time stamp from the user when the nutritional composition is activated.

S77. The system according to any of the preceding embodiments wherein the nutritional composition comprises the dose component(s).

S78. The system according to any of the preceding embodiments wherein the nutritional composition comprises at least one of a capsule and tablets and granular(s) and powder and bar and syrup and elixirs and suspensions and emulsions.

S79. The system according to any of the preceding embodiments wherein the nutritional composition further comprises a modified-release supplement.

S80. The system according to the preceding embodiment wherein the modified-release supplement is configured to at least one of decrease the rate of the dose component metabolism.

S81. The system according to any of the preceding two embodiments wherein the modified-release supplement is configured to release the at least one dose component over a time span of 1 hour to 24 hours, such as 3 hours to 16 hours, preferably 5 hours to 10 hours, more preferably 6 hours to 8 hours.

S82. The system according to any of the preceding system embodiments, wherein the processing module (1) is configured to perform a multidimensional optimization when generating the nutrient composition.

S83. The system according to the preceding system embodiment, wherein performing the multidimensional optimization includes at least two variables to be optimized.

S84. The system according to any of the preceding system embodiments wherein the processing component (1) is configured to allow a maximum quantity of at least one nutrient to be pre-set.

S85. The system according to any of the preceding system embodiments wherein the processing component (1) is configured to allow a plurality of individual maximum quantities of different nutrients to be pre-set.

Below, method embodiments will be discussed. These embodiments are abbreviated by the letter "M" followed by a number. Whenever reference is herein made to "method embodiments", these embodiments are meant.

M1. A method automatically composing an individualized nutritional composition, wherein the method comprises the step of:
  a. generating a sensor dataset(s) using a plurality of sensors at a user terminal;
  b. generating structured biomarker data based on the sensor dataset;
  c. recommending a dose value based on the structured biomarker data; and
  d. automatically composing a nutritional composition based on the dose vale.

M2. The method according to the preceding embodiment wherein the method comprises the step of classifying the sensor dataset into the structured biomarker data.

M3. The method according to any of the preceding embodiments wherein the method comprises automatically determining a measure value associated with the structured biomarker data.

M4. The method according to any of the preceding embodiments wherein the method comprises the step of classifying the sensor dataset into the structured biomarker data using a processing component.

M5. The method according to any of the preceding embodiments wherein the method comprises the step of recommending a dose value using a recommending engine.

M6. The method according to any of the preceding embodiments wherein the processing component is configured to extract the sensor dataset(s) from a datastore.

M7. The method according to any of the preceding embodiments wherein a server comprises the at least one of processing component and recommending engine and the datastore.

M8. The method according to any of the preceding embodiments wherein the processing component comprises an artificial neural network, preferably a convolutional neural network.

M9. The method according to any of the preceding embodiments wherein the method comprises semi or fully unsupervised classification of the sensor dataset using an existing knowledgebase.

M10. The method according to any of the preceding embodiments wherein the method further comprises automatically determining a measure value associated with the structured biomarker data.

M11. The method according to any of the preceding embodiments wherein the method comprises automatically transmitting the structured biomarker data to the recommending engine, preferably via a communication protocol.

M12. The method according to any of the preceding embodiments wherein the method further comprises the step of automatically detecting a type of the sensor prior to the classification of the sensor dataset.

M13. The method according to the preceding embodiment wherein the step of detecting the type of the sensor is based on a data structure of the sensor dataset.

M14. The method according to any of the preceding embodiments wherein the method comprises programming the artificial neural network according to the data structure of the sensor dataset.

M15. The method according to any of the preceding embodiments wherein the type of the sensor(s) comprises at least one of:
biochemical sensor and
wearable biochemical sensor and
a voice intonation sensor and/or mood recognition sensor and
a face mood recognition sensor and
an activity sensor and
a skin humidity sensor comprising of a galvanic skin response sensor and
a thermometer and
a blood oxygen sensor and
a questionnaire.

M16. The method according to any of the preceding embodiments wherein the sensor is configured with at least one of:
Accelerometer and
GPS and optical heart rate monitors and
UV sensor and
bioimpedance sensor and
actigraphy sensor and
pH sensors and
oximeter.

M17. The method according to any of the preceding embodiments wherein the method comprises automatically transmitting the structured biomarker data, comprising the measure value, to the recommending engine.

M18. The method according to any of the preceding embodiments wherein the method comprises the step of extracting at least one updated sensor dataset, at a pre-determined time interval, using a monitoring component.

M19. The method according to the preceding embodiment wherein monitoring component comprises a self-improving artificial intelligence unit.

M20. The method according to any of the preceding embodiment wherein the method comprises transmitting the dose value to a user terminal.

M21. The method according to any of the preceding method embodiments wherein the method is a computer implemented method.

M22. The method according to any one of the preceding method embodiments comprising performing a multi-dimensional optimization by the processing module when generating the nutrient composition.

M23. The method according to the preceding method embodiment, wherein performing the multidimensional optimization includes at least two variables to be optimized.

M24. The method according to any of the preceding method embodiments with the further step of pre-setting a maximum quantity of at least one nutrient.

M24. The method according to any of the preceding method embodiments with the further step of pre-setting a plurality of maximum quantities of different nutrients.

S87. The system according to any of the preceding system embodiments wherein the system is configured to carry out the method according to any of the method embodiments.

Below, use embodiments will be discussed. These embodiments are abbreviated by the letter "U" followed by a number. Whenever reference is herein made to "use embodiments", these embodiments are meant.

U1. A use of the system according to any of the preceding system embodiments to carry out the method according to any of the preceding method embodiments.

BRIEF DESCRIPTION OF FIGURES

The present invention will now be described with reference to the accompanying drawings, which illustrate embodiments of the invention. These embodiments should only exemplify, but not limit, the present invention.

DETAILED DESCRIPTION OF FIGURES

It is noted that not all the drawings carry all the reference signs. Instead, in some of the drawings, some of the reference signs have been omitted for sake of brevity and simplicity of illustration. Embodiments of the present invention will now be described with reference to the accompanying drawings.

Figure 1:
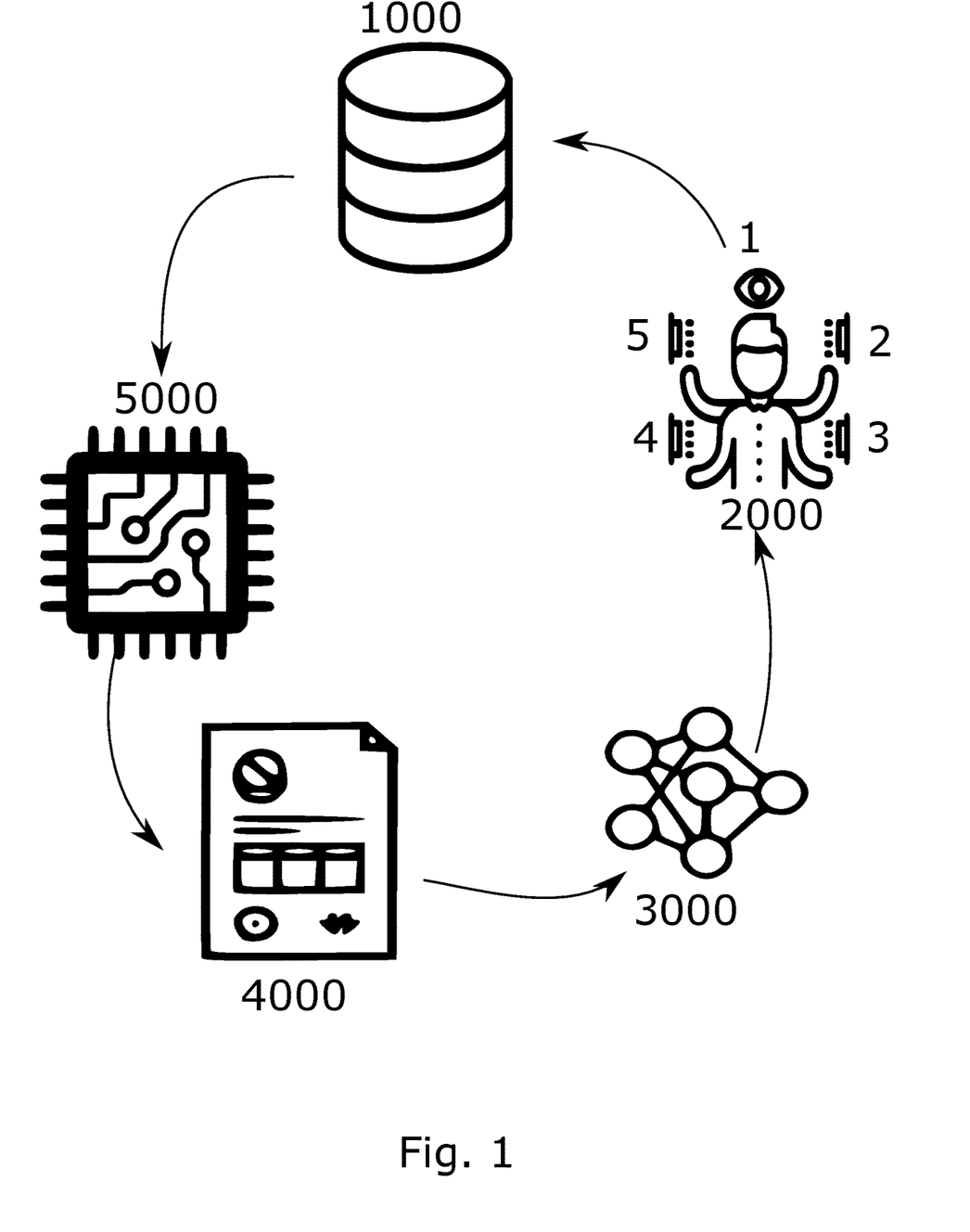
FIG. 1 schematically depicts an embodiment of the present invention.

FIG. 1 schematically depicts an embodiment of system and a respective method to generate a personalized data-based nutritional composition.

The present invention may provide a datastore (1000). The datastore (1000) may be a cloud datastore or a local datastore. The datastore (1000) may be configured to automatically generate shard(s) and replica(s) of the stored database. The datastore (1000) may also be configured to automatically update any changes made to any data structure stored. The datastore may further be configured to automatically pull at least one sensor dataset from at least one or a plurality of sensors (1-5) and/or to receive those datasets. The sensors (1-5) may be configured to be installed in or to a user terminal (2000). The sensors (1-5) may comprise a voice intonation sensor and/or a mood recognition sensor. The sensor (1-5) may comprise a face mood recognition sensor and/or an activity sensor. The sensor (1-5) may also be configured with a questionnaire and an analysis component for converting the respective data into a machine-readable form and/or further submitting respective data to the datastore. The sensor (1-5) can comprise an anamnesis questionnaire. The questionnaire may comprise a digital survey which can be completed by the user, for example, over the internet. The sensor(s) (1-5) may comprise at least one wearable. The sensor or the plurality of the sensors may be configured to transmit the data to the datastore (1000).

A processing component (5000) may be configured to extract the sensor dataset from the datastore (1000). The processing component (5000) may be configured to assign class labels to particular data points in the sensor dataset. The processing component (5000) may be configured with at least one of a linear classifier and a nearest neighbor classifier and a decision tree classifier and artificial neural networks. The processing component (5000) may be configured to generate biomarker data based on the sensor dataset. The processing component (5000) may be configured to classify the sensor dataset based on the data structure of the sensor dataset. The sensor dataset may be classified by the processing component (5000) into a plurality of biomarker components. For example, if the sensor dataset comprises a scan of a user's lab test report, for example a pdf document, the processing component (5000) may comprise a machine learning classifier. Further, the processing component may be configured to map the lab test report data to at least one or a plurality of specific category(s) of biomarker(s). The structured biomarker data as generated by the processing component may comprise at least one biomarker component, such as Fe, Zn, K etc.

The processing component (5000) may further be configured to enable a bi-lateral data exchange with a recommending engine (4000). The recommending engine can be an electronic device configured to perform at least one of processes and calculations and operations based on instructions provided by a software and/or a hardware. The recommending engine (4000) may be configured to calculate a dose value based on the structured biomarker data. The structured biomarker data can be generated by a static map or by dynamic data or even a deep neural network. The biomarker data may also comprise at least one user's anamnesis. The recommending engine (4000) may generate the dose value via a machine learning recommender system. The machine learning recommender system may be configured with a content-based recommender system and/or a collaborative filtering recommender system. The collaborative filtering recommender system may be configured to extract at least one past user data.

The collaborative filtering recommender system may further be configured with a model based and/or a memory-based recommender system. The recommending engine (4000) may further be configured with prediction tool. The prediction tool may predict at least one dose value based on the past user data. The model-based recommender system may be configured to extract at least one model from an existing knowledgebase, such as the Internet. The recommending engine (4000) may further be extracting a user input from a user terminal to predict a dose value. The content-based recommender system may be configured to pull the biomarker data and at least one of geographical data, age, time, gender data, past data from the sensor dataset to predict the dose value.

A mixer (3000) may be configured to extract the dose value from the recommending engine and generate an optimized nutritional composition. The mixer (3000) may be configured to be installed at the user terminal. The mixer (3000) may be configured to enable a bilateral data exchange with a monitoring component. The mixer (3000) may further be connected with at least one storage of at least one nutrient and dietary supplements. The mixer can be configured to generate the optimized nutritional composition based on the dose value by at least one of emulsifying and juicing and mixing and blending and milling and whipping and weighing and grinding and stirring at least one or a plurality of the nutrients and/or dietary supplements from the storage.

The storage may further be equipped gas flush function, wherein the gas may be an inert gas such as nitrogen, etc. This may be particularly advantageous to keep the components of the storage fresh. The mixer may be configured to receive an automatically generated computer-aided design model of the nutritional composition by the recommending engine. The mixer may further be configured to develop a three-dimensional object based on the computer-aided design model. Furthermore, the nutritional composition may comprise at least one or a plurality of nutrient supplements, dietary supplements, etc.

Figure 2:
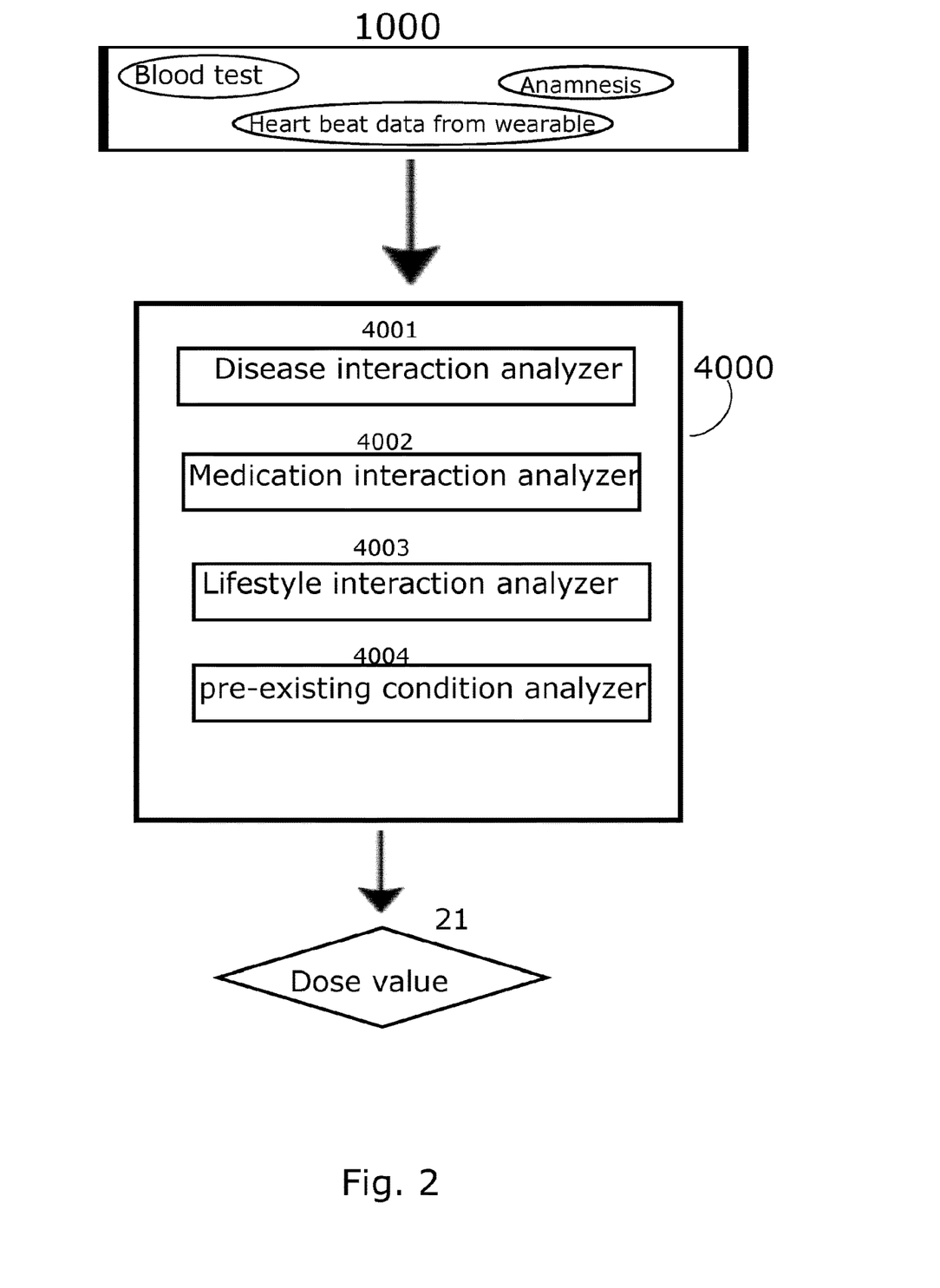
FIG. 2 schematically depicts an embodiment of the method according to the present invention.

FIG. 2 schematically depicts an embodiment of the method according to the present invention. The recommending engine (4000) may be configured to generate individual decision trees for the biomarker component. The biomarker component(s) may comprise, vitamins, minerals fatty acids, amino acids, plant extract, etc. The decision tree generated by the recommending engine may be configured to represent an interaction of a biomarker component with the user's past health data (such as allergic reactions), lifestyle, medication, etc. The past health data may be extracted by the processing component (5000) from the sensor dataset. The recommending engine (4000) may be configured with a disease interaction analyzer (4001). The disease interaction analyzer (4001) may be configured to generate the dose value based on data from the anamnesis, for example if it is extracted from the sensor dataset that the user suffers from Osteoarthritis and has had gone through a cancer therapy in the past the recommending engine (4000) may not generate the dose value comprising folic acid (which can fuel growth of cancerous cells) but will include biomarker component effective for Osteoarthritis, for example, Glucosamine Sulfate and/or Chondroitin Sulfate and/or Methylsulfonylmethane. The recommending engine (4000) may further be configured to periodically self-learn from the existing knowledgebase.

Figure 4:
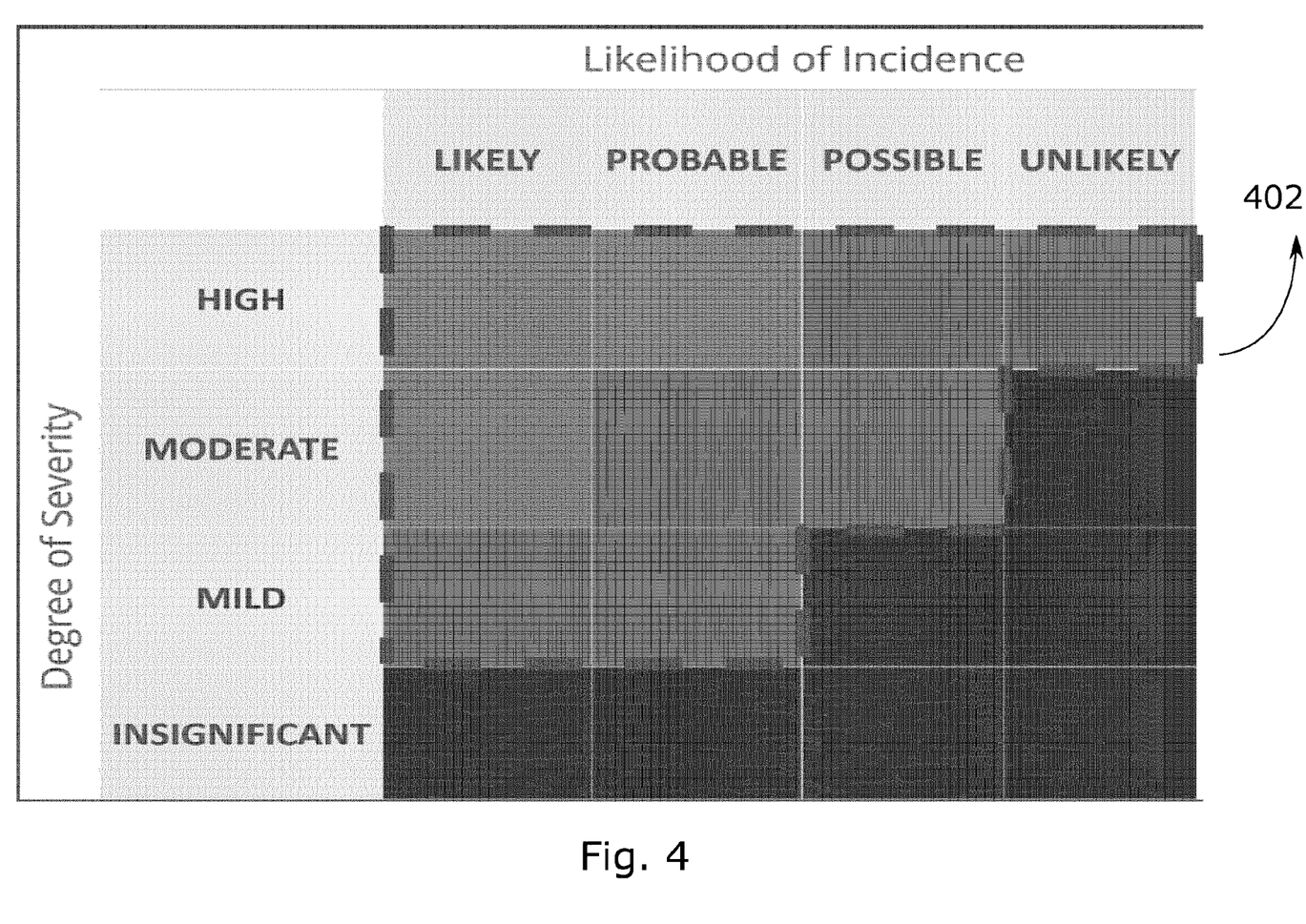
FIG. 4 shows an exemplary representation of medication interaction according to one embodiment of the present invention.

The recommending engine (4000) may further be configured with a medication interaction analyzer (4002). The medication interaction analyzer may be configured to extract past health data from the processing component (5000). The past health data may comprise information related to present medicines/supplements present in the sensor dataset. The medication interaction analyzer (4002) may also be configured to automatically calculate a likelihood and/or a severity of interaction of the dose value with the medication. For example, if the processing component (5000) learns from the sensor dataset that medication data comprises Levothyroxine and/or Warfarin the medication interaction analyzer (4002) will generate an interaction table (as shown in FIG. 4), for example, Calcium has moderate interaction level, Fe has moderate interaction level, Vitamin K2 has major interaction level. In this case even if the biomarker data suggests that the dose value should comprise Vitamin K2 recommending engine will predict other alternatives. The medication interaction analyzer (4002) may further be configured to determine the biomarker component depletion in the structured biomarker data. For example, a low level of potassium might be associated with the diuretics intake. The medicine interaction analyzer (4002) can also be configured to generate the dose value (21) comprising potassium if the medication data comprises diuretics.

The recommending engine (4000) may further comprise a lifestyle interaction analyzer (4003). The lifestyle extraction analyzer (4003) may further be configured to extract a lifestyle data from the processing component (5000). The structured biomarker data may comprise the lifestyle data generated based on the sensor dataset(s). The lifestyle extraction analyzer (4003) may be configured to generate the dose value based on the lifestyle data. For example, the lifestyle interaction analyzer (4003) may be configured to extract the data from the skin humidity sensor. The lifestyle interaction analyzer (4003) may further extract the lifestyle data, in this example the number of hours spend in sports from the structured biomarker data. And based on the lifestyle data and may be the skin humidity sensor data the lifestyle interaction analyzer (4003) generate the dose value comprising electrolytes. The dose value may further be generated based on a condition data. The condition data may be extracted from the structured biomarker data. For example, if the structured biomarker data contains a leather contact allergy the recommending engine may not generate dose value comprising chromium. The recommending engine (4000) may be configured to generate the dose value after analyzing the interactions.

Figure 3:
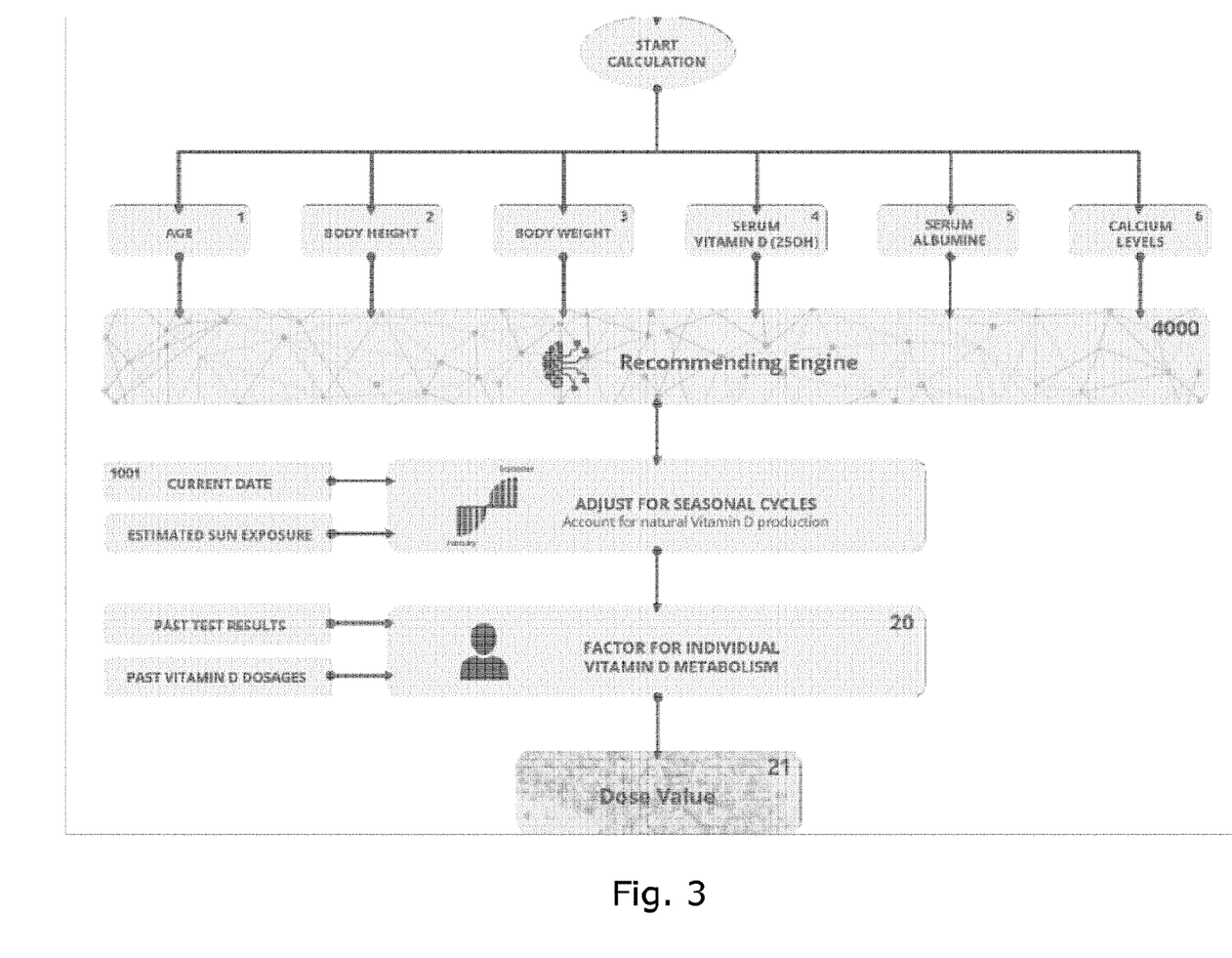
FIG. 3 shows a method according to one embodiment of the present invention.

In FIG. 3 a method according to one embodiment of the present invention is shown. The recommending engine (4000) extracts at least one of age (1), body height (2), body weight (3), an analyte (4), a second analyte (5), a third analyte (6) data from the processing component (5000) and/or the sensor dataset(s). For example, as shown in FIG. 3 is a method shown for the generation of the dose value with vitamin D as the analyte. It may be noted that this is an exemplary representation showing a specific dose component. The recommending engine (4000) may be configured to automatically extract the appropriate data from the processing component and/or the sensor dataset(s) based on the dose component. For example, season and/or geographical data may be extracted for the Vitamin D analysis and activity data may be extracted for insulin analysis.

To generate the dose value the recommending engine (4000) may also be configured to extract the current date (1001) from the datastore, such as from the data stamp given to the sensor dataset(s) by the processing component. The current date (1001) may be the date when the sensor dataset(s) may be stored or transferred to the datastore. The processing component (5000) may be configured to access the existing database, such as the internet and determine an estimated sun exposure (1002) for the current date (1001). The recommending engine may further be configured to generate the dose value based on the sun exposure. Furthermore, the recommending engine (4000) may be configured to extract past data, such as past test results and/or past vitamin D intake from the sensor dataset(s). Based on the past data the recommending engine (4000) may further be configured to generate a measure value (20) associated with the dose value (21), in this example for vitamin D. It is to be noted that vitamin D and sun exposure are only used for exemplary purposes. The recommending engine (4000) may be configured to generate a dose value (21) comprising of any analytes and phenotypes. In the shown example analytes are shown as albumin, calcium and serum levels of vitamin D. In this particular example with vitamin D, there is a strong correlation with the current season which may not be for other analytes or components of the dose value. The measure value (20) may also be based on individual metabolism which may be determined using the past data. Two users might have same structured biomarker data and same demographics and intake same dose value for the same time might not have the same updated biomarker data. For such cases, the recommending engine (4000) is configured to generate the dose value (21) based on multiple factors.

FIG. 4 shows an exemplary 2D interaction matrix. The interaction is represented between the two components of the dose value and/or between the one already existing analyte and the component of the dose value. The interaction matrix may represent a likelihood of two analytes interacting and may be a level of severity of the interaction. The likelihood of occurrence may be determining a likelihood of interaction of the dose component with an existing analyte. The level 'likely' as shown in FIG. 4 may be when there is an interaction based on the existing knowledgebase. The level 'probable' may be an interaction which has been automatically and/or semi-automatically learned by the recommending engine by the past data. The level 'possible' may be an interaction that shows a difference between the existing database and the past data. The level 'unlikely' may be the interaction that may be difficult to occur. On the second dimension in this embodiment level of severity of the interaction is shown. The interaction may be high such as life threatening, moderate such as worse the clinical status, mild such as may cause minor side effect(s), insignificant such as will not cause any side effect(s). It may also be noted that only the dose components lying in the safe region (4021) will be used for the generation of the dose value (21). The safe region (4021) may further comprise cut-off value for the dose components, such as not more than 300 mg Vitamin C. The interaction matrix may be generated by the recommending engine based on the at least one of the geographical data, age, time, gender data from the sensor dataset and past data to facilitate the generation of the dose value (21).

Figure 5:
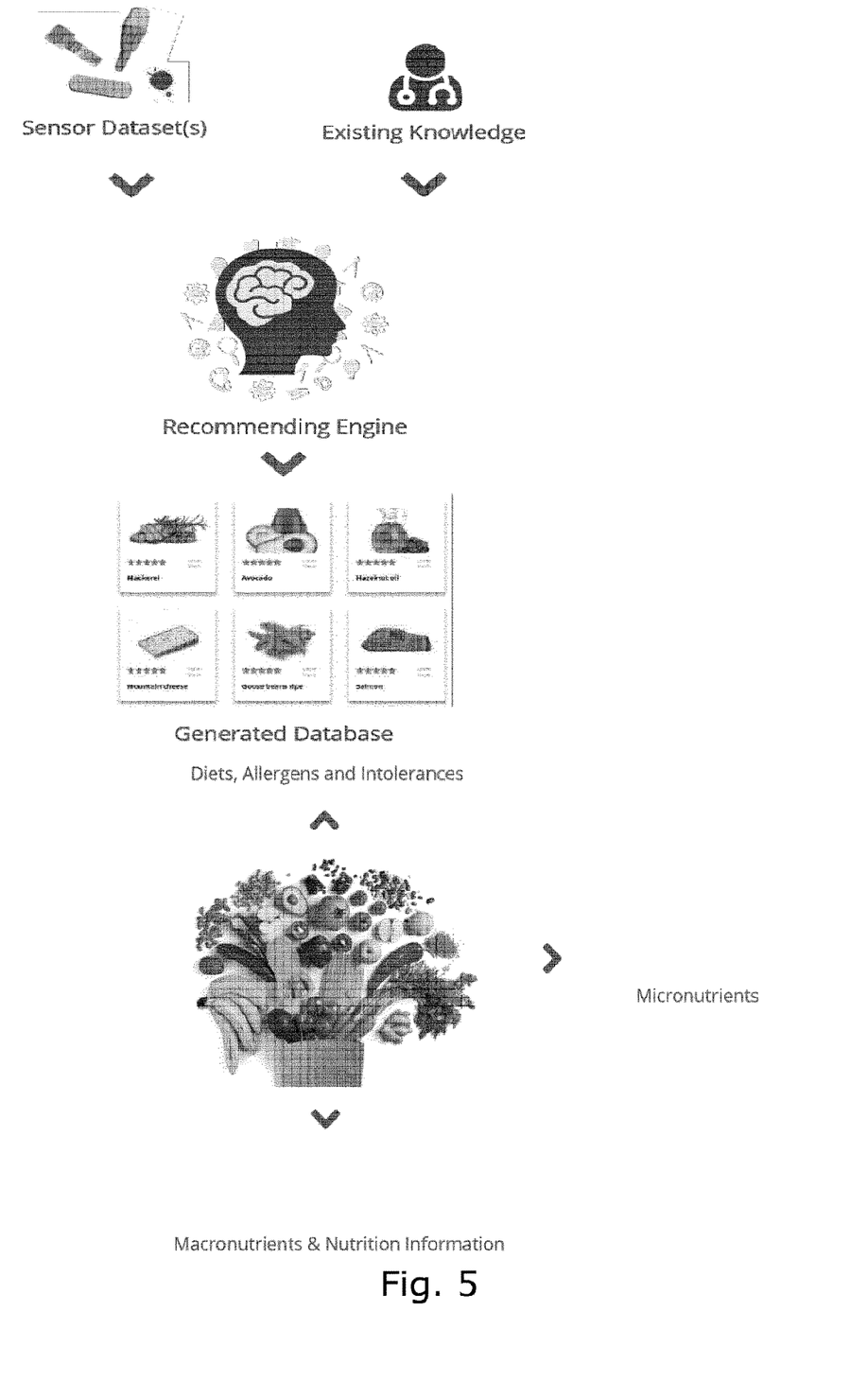
FIG. 5 shows an embodiment of a user interface according to the present invention.

FIG. 5 shows an exemplary user interface. The user interface may be a personal computer and/or an app on a smart phone and/or any other stationary or handheld device. The user interface may also be a smart device configured to enable a bi-lateral data transmission with the processing component and/or the server. The user interface may comprise a graphic display configured to transmit a generated database. The generated database may be configured to be generated by the recommending engine based on the dose value. The database may comprise a plurality of dietary components and recipes in multiple languages. The recommending engine may be pulling the dietary data from the existing database such as the internet and then generating the database according to the individual dose value. The user interface may further be configured to extract at least one user input and transmit it to the processing component and/or the server. For example, the user may provide a situation input, such as 4 h pre-marathon and the processing component may create the structured biomarker data and transmit it to the recommending engine. The recommending engine then will calculate the dose value with a '4 h pre-marathon' and then generate the database. Such as, a recipe for an easy-to-prepare rice and chicken pan.

Reference numbers and letters appearing between parentheses in the claims, identifying features described in the embodiments and illustrated in the accompanying drawings, are provided as an aid to the reader as an exemplification of the matter claimed. The inclusion of such reference numbers and letters is not to be interpreted as placing any limitations on the scope of the claims.

The term "at least one of a first option and a second option" is intended to mean the first option or the second option or the first option and the second option.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

The invention claimed is:

1. A system configured to automatically create compose an individualized nutritional composition, wherein the system comprises:
(a) a datastore, configured to store and receive one or more sensor datasets from a plurality of sensors;
(b) a processing component, configured to extract the one or more sensor datasets from the datastore, and further to automatically generate structured biomarker data based on the one or more sensor datasets, wherein the processing component automatically detects a type of at least one of the plurality of sensors prior to the classification of the one or more sensor datasets;

(c) a recommending engine, configured to automatically determine a dose value based on the structured biomarker data; and (d) a mixer comprising a programmable automated machine configured to receive operational instructions from the recommending engine and, based on said operational instructions, to automatically create the nutritional composition based on the dose value determined by the recommending engine, by at least one of (1 emulsifying, and/or (ii) juicing, and/or (iii) mixing, and/or (iv) blending, and/or (v) milling, and/or (vi) whipping, and/or (vii) weighing, and/or (viii) grinding, and/or (ix) stirring at least one or a plurality of dose components.

2. The system according to claim 1 wherein each sensor is configured to be associated with at least one user terminal.

3. The system according to claim 1 wherein the system further comprises a server, wherein the server is configured with the at least one of processing component and recommending engine.

4. The system according to claim 1 wherein the processing component is configured with a machine-learning classifier configured to automatically classify the one or more sensor datasets to the structured biomarker data, wherein the structured biomarker data comprises at least one or a plurality of analytes and genotypes.

5. The system according claim 1 wherein the processing component automatically detects a type(s) of the sensor prior to classification of the one or more sensor datasets, based on a data structure of the one or more sensor datasets generated by the respective sensor.

6. The system according to claim 5 further comprising the processing component configured to program an artificial neural network based on the data structure of the one or more sensor datasets.

7. The system according to claim 5, wherein the type of sensor comprises at least one of:
a voice intonation sensor and/or mood recognition sensor; and/or
a face mood recognition sensor; and/or
an activity sensor; and/or
a skin humidity sensor comprising a galvanic skin response sensor; and/or
a thermometer; and/or
a blood oxygen sensor; and/or
a questionnaire; and/or
a biochemical sensor; and/or
wearable biochemical sensor.

8. The system according to claim 7 wherein the sensor(s) is configured with at least one of:
an accelerometer; and/or
GPS; and/or
an optical heart rate monitor; and/or
a UV sensor; and/or
a bioimpedance sensor; and/or
an actigraphy sensor; and/or
a pH sensor; and/or
an oximeter; and/or
a chromatographer; and/or
a mass spectroscope.

9. The system according to claim 1 wherein the system comprises the processing component which is further configured to transmit the structured biomarker data, preferably comprising a measure value, to the recommending engine.

10. The system according to claim 1 wherein the recommending engine is configured to automatically generate a significance score, preferably based on at least one of existing knowledgebase and geographical data and age and time stamp and gender data and past data, associated with each biomarker component in the structured biomarker data.

11. The system according to claim 1 wherein the recommending engine further comprises at least one of disease interaction analyzer and medication interaction analyzer and lifestyle interaction analyzer configured to determine the dose value.

12. The system according to claim 1 wherein the dose value comprises at least one or a plurality of dose components, wherein the dose components comprising at least one or a plurality of analytes and dietary supplements and nutritional supplements.

13. The system according to claim 1 wherein the recommending engine is further configured to calculate a weight associated with each dose component, wherein the weight is automatically calculated based on a distance between at least two dose components on an interaction matrix.

14. The system according to claim 1 wherein the system further comprises a monitoring component, wherein the monitoring component is configured to extract at least one updated sensor dataset at a pre-determined time interval.

15. The system according to claim 12, wherein the individualized nutritional composition further comprises a modified-release supplement, wherein the modified-release supplement is configured to release the at least one dose component over a time span of 1 hour to 24 hours, such as 3 hours to 16 hours, preferably 5 hours to 10 hours, more preferably 6 hours to 8 hours.

16. A method automatically creating an individualized nutritional composition, wherein the method comprises the steps of:
(a) generating one or more sensor datasets using a plurality of sensors at a user terminal;
(b) automatically detecting a type of at least one of the plurality of sensors;
(c) generating structured biomarker data based on the one or more sensor datasets;
(d) recommending a dose value based on the structured biomarker data; and
(e) based on said recommending, automatically creating said individualized nutritional composition based on the dose value by at least one of (i) emulsifying, and/or (ii) juicing, and/or (iii) mixing, and/or (iv) blending, and/or (v) milling, and/or (vi) whipping, and/or (vii) weighing, and/or (viii) grinding, and/or (ix) stirring at least one or a plurality of dose components.

17. The system according to claim 4 wherein the structured biomarker data comprises at least one or a plurality of analytes and phenotypes and genotypes.

18. The system of claim 1 wherein the mixer is a programmable automated machine, configured to receive operational instructions from the recommending engine, wherein the mixer comprises a device configured with a motor for fast and/or slow blending and/or stirring.

* * * * *